(12) United States Patent
Hou et al.

(10) Patent No.: US 11,335,969 B2
(45) Date of Patent: May 17, 2022

(54) BATTERY MODULE

(71) Applicant: CONTEMPORARY AMPEREX TECHNOLOGY CO., LIMITED, Fujian (CN)

(72) Inventors: Yuepan Hou, Fujian (CN); Xingdi Chen, Fujian (CN); Linggang Zhou, Fujian (CN); Peng Wang, Fujian (CN); Kaijie You, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/360,555

(22) Filed: Jun. 28, 2021

(65) Prior Publication Data

US 2021/0328303 A1    Oct. 21, 2021

Related U.S. Application Data

(63) Continuation of application No. PCT/CN2019/079501, filed on Mar. 25, 2019.

(30) Foreign Application Priority Data

Dec. 28, 2018    (CN) .......................... 201811621892.1

(51) Int. Cl.
*H01M 50/342*    (2021.01)
*H01M 10/613*    (2014.01)
(Continued)

(52) U.S. Cl.
CPC ..... *H01M 50/3425* (2021.01); *H01M 10/613* (2015.04); *H01M 10/6554* (2015.04);
(Continued)

(58) Field of Classification Search
CPC . A62C 35/10; A62C 3/16; A62C 3/07; H01M 10/613; H01M 10/625;
(Continued)

(56) References Cited

U.S. PATENT DOCUMENTS 8,475,952 B2    7/2013 Yasui et al.
2009/0087727 A1    4/2009 Harada et al.
(Continued)

FOREIGN PATENT DOCUMENTS

CN    102197531 A    9/2011
CN    103825059 A    5/2014
(Continued)

OTHER PUBLICATIONS

International Search Report dated Sep. 10, 2019 issued in PCT/CN2019/079501.

*Primary Examiner* — Lingwen R Zeng
(74) *Attorney, Agent, or Firm* — Scully Scott Murphy & Presser (57) ABSTRACT

The present application provides a battery module, which includes: a plurality of batteries, each battery including a top cover, and a first electrode terminal, a second electrode terminal and an explosion-proof valve being disposed on the top cover in a width direction; and a first heat exchange plate including: a first main body portion and a first bending portion bending from an upper side of the first main body portion to the plurality of batteries in the width direction; the first bending portion covers explosion-proof valves of at least some of the batteries in the width direction, a flow channel for flow of a heat exchange medium is disposed in the first bending portion, and the first bending portion is configured to be capable of leaking the heat exchange medium in the flow channel after being melted.

20 Claims, 9 Drawing Sheets

(51) Int. Cl.
*H01M 10/6554* (2014.01)
*A62C 3/07* (2006.01)
*A62C 3/16* (2006.01)
*H01M 10/6568* (2014.01)
*A62C 35/10* (2006.01)
*H01M 10/6556* (2014.01)
*H01M 50/209* (2021.01)
*H01M 50/55* (2021.01)

(52) U.S. Cl.
CPC .............. *A62C 3/07* (2013.01); *A62C 3/16* (2013.01); *A62C 35/10* (2013.01); *H01M 10/6556* (2015.04); *H01M 10/6568* (2015.04); *H01M 50/209* (2021.01); *H01M 50/55* (2021.01); *Y02E 60/10* (2013.01)

(58) Field of Classification Search
CPC ......... H01M 10/6554; H01M 10/6556; H01M 10/6568; H01M 50/20; H01M 50/3425; H01M 50/209; H01M 50/55; Y02E 60/10
See application file for complete search history.

(56) References Cited

U.S. PATENT DOCUMENTS

| | | | |
|---|---|---|---|
| 2010/0073005 A1* | 3/2010 | Yano | H01M 50/209 324/427 |
| 2011/0200856 A1 | 8/2011 | Yasui et al. | |
| 2015/0270516 A1 | 9/2015 | McLeskey et al. | |

FOREIGN PATENT DOCUMENTS

| | | |
|---|---|---|
| CN | 106152818 A | 11/2016 |
| CN | 206040913 U | 3/2017 |
| CN | 108258167 A | 7/2018 |
| CN | 207637935 U | 7/2018 |
| CN | 108400408 A | 8/2018 |
| CN | 110199406 A | 9/2019 |
| EP | 2302727 A1 | 3/2011 |
| JP | H09259940 A | 10/1997 |
| JP | H11307139 A | 11/1999 |
| JP | 2008251263 A | 10/2008 |
| JP | 2010073406 A | 4/2010 |
| JP | 2017147128 A | 8/2017 |

* cited by examiner

BATTERY MODULE

CROSS-REFERENCE TO RELATED APPLICATIONS

This application is a continuation of International Application No. PCT/CN2019/079501, filed on Mar. 25, 2019, which claims priority to Chinese Patent Application No. 201811621892.1, filed on Dec. 28, 2018. The disclosures of the aforementioned applications are hereby incorporated by reference in their entireties.

TECHNICAL FIELD

The present application relates to the field of secondary batteries, and in particular, to a battery module.

BACKGROUND

At present, in thermal management of the new energy automobile industry, to achieve effective heat dissipation of a battery pack, a way to cool the battery pack by a liquid cooling system is generally adopted. As the industry attaches great importance to safety of electric automobiles, how to use a low-cost solution to achieve reduction of a degree of thermal runaway of batteries when the thermal runaway occurs in the batteries in the battery pack, so as to buy escape time for a passenger and/or buy time to extinguish the thermal runaway manually is a problem to be solved.

SUMMARY

In view of defects in the prior art, the objective of the present application is to provide a battery module, which could exchange heat for batteries and reduce a degree of thermal runaway.

To achieve the above objective, the present application provides a battery module, which includes: a plurality of batteries arranged in a length direction, each battery including a top cover, and a first electrode terminal, a second electrode terminal and an explosion-proof valve being disposed on the top cover in a width direction; and a first heat exchange plate including: a first main body portion located on one side of the plurality of batteries in the width direction; and a first bending portion bending from an upper side of the first main body portion to the plurality of batteries in the width direction, the first bending portion covering explosion-proof valves of at least some of the batteries in the width direction, a flow channel for flow of a heat exchange medium being disposed in the first bending portion, and the first bending portion being configured to be capable of leaking the heat exchange medium in the flow channel after being melted.

In an embodiment, the first bending portion of the first heat exchange plate completely covers the explosion-proof valves of the at least some of the batteries in the width direction.

In an embodiment, an explosion-proof valve of each battery is disposed between a corresponding first electrode terminal and a corresponding second electrode terminal, and the first bending portion of the first heat exchange plate covers the explosion-proof valve of each battery in the width direction.

In an embodiment, an explosion-proof valve of each battery is disposed at an end part of the top cover in the width direction, explosion-proof valves of the plurality of batteries are located on a same side in the width direction, and the first bending portion of the first heat exchange plate covers the explosion-proof valve of each battery in the width direction.

In an embodiment, the battery module further includes: a second heat exchange plate located on the other side of the plurality of batteries in the width direction, where a flow channel for flow of a heat exchange medium is disposed, and being in thermally conductive contact with corresponding side faces of the plurality of batteries in the width direction.

In an embodiment, the first bending portion of the first heat exchange plate covers a part of the explosion-proof valve of each battery in the width direction; the battery module further includes a second heat exchange plate, the second heat exchange plate including: a second main body portion located on the other side of the plurality of batteries in the width direction; and a second bending portion bending from an upper side of the second main body portion to the plurality of batteries in the width direction, the second bending portion covering the other part of the explosion-proof valve of each battery; and a flow channel for flow of a heat exchange medium is disposed in the second bending portion, and the second bending portion is configured to be capable of leaking the heat exchange medium in the flow channel after being melted.

In an embodiment, the first bending portion abuts the second bending portion in the width direction.

In an embodiment, an explosion-proof valve of each battery is disposed at an end part of the top cover in the width direction, and explosion-proof valves of the plurality of batteries are located on two sides in the width direction; the battery module further includes a second heat exchange plate, the second heat exchange plate including: a second main body portion; and a second bending portion bending from an upper side of the second main body portion to the plurality of batteries in the width direction, a flow channel for flow of a heat exchange medium being disposed in the second bending portion, and the second bending portion being configured to be capable of leaking the heat exchange medium in the flow channel after being melted; the first main body portion and the second main body portion are located on two sides of the plurality of batteries in the width direction; and the first bending portion and the second bending portion cover explosion-proof valves on corresponding sides in the width direction.

In an embodiment, explosion-proof valves of some batteries are disposed at end parts of corresponding top covers in the width direction, and explosion-proof valves of the some batteries are located on a same side in the width direction; explosion-proof valves of the other batteries are disposed between corresponding first electrode terminals and corresponding second electrode terminals; the first bending portion of the first heat exchange plate covers the explosion-proof valves of the some batteries in the width direction; the battery module further includes a second heat exchange plate including: a second main body portion located on the other side of the plurality of batteries in the width direction; and a second bending portion bending from an upper side of the second main body portion to the plurality of batteries in the width direction, the second bending portion covering the explosion-proof valves of the other batteries in the width direction; and a flow channel for flow of a heat exchange medium is disposed in the second bending portion, and the second bending portion is configured to be capable of leaking the heat exchange medium in the flow channel after being melted.

In an embodiment, a flow channel for flow of a heat exchange medium is also disposed in the first main body portion, and the first main body portion is in thermally conductive contact with side faces of the plurality of batteries in the width direction.

In an embodiment, a flow channel for flow of a heat exchange medium is also disposed in the second main body portion, and the second main body portion is in thermally conductive contact with corresponding side faces of the plurality of batteries in the width direction.

In an embodiment, the first main body portion of the first heat exchange plate is connected to side faces of the plurality of batteries in the width direction.

In an embodiment, the first heat exchange plate includes: a first outer plate provided with first bulging ribs protruding toward the flow channel; and a first inner plate connected to side faces of the plurality of batteries in the width direction, the first inner plate being connected to the first outer plate, and the first inner plate, the first bulging ribs of the first outer plate and the first outer plate together forming flow channels for flow of a heat exchange medium in the first main body portion and the first bending portion that are communicated.

In an embodiment, the second main body portion of the second heat exchange plate is connected to side faces of the plurality of batteries in the width direction.

In an embodiment, the second heat exchange plate includes: a second outer plate provided with second bulging ribs protruding toward the flow channel; and a second inner plate connected to corresponding side faces of the plurality of batteries in the width direction, the second inner plate being connected to the second outer plate, and the second inner plate, the second bulging ribs of the second outer plate and the second outer plate together forming flow channels for flow of a heat exchange medium in the second main body portion and the second bending portion that are communicated.

The beneficial effects of the present application are as follows:

in a battery module of the present application, a first heat exchange plate is configured to exchange heat for batteries, and when a high-temperature and high-pressure gas generated inside the batteries breaks through explosion-proof valves on top covers of the batteries so as to be released from the batteries, the high-temperature and high-pressure gas and/or an electrolyte doped in the outflowing high-temperature and high-pressure gas may quickly melt a first bending portion of the first heat exchange plate that covers or is near the explosion-proof valves, and a heat exchange medium in the first bending portion flows out. In this case, on one hand, the outflowing heat exchange medium lowers the temperature of the high-temperature and high-pressure gas breaking through the explosion-proof valves and/or the outflowing doped electrolyte to avoid fire. On the other hand, the outflowing heat exchange medium may enter insides of the explosion-proof valves to lower the temperature of the batteries. Accordingly, a degree of thermal runaway of the batteries is reduced, so as to buy escape time for a passenger and/or buy time to extinguish the thermal runaway manually.

Reference signs are explained as follows:

1 battery
   10 top cover
   11 first electrode terminal
   12 second electrode terminal
   13 explosion-proof valve
   14 side face
2 first heat exchange plate
   21 first main body portion
   22 first bending portion
   23 first external plate
      231 first rib
   24 first inner plate
   25 first adapting head
3 second heat exchange plate
   31 second main body portion
   32 second bending portion
   33 second external plate
      331 second rib
   34 second inner plate
   35 second adapting head
4 end plate
V row of explosion-proof valves
V1 first row of explosion-proof valves
V2 second row of explosion-proof valves
G thermal conductive structural glue
L length direction
W width direction
H height direction

DESCRIPTION OF EMBODIMENTS

The accompanying drawings show embodiments of the present application, and it will be understood that the disclosed embodiments are merely examples of the present application, and the present application may be implemented in various forms. Therefore, the specific details disclosed herein should not be understood as limitations, but rather as the basis of the claims and as the basis of indication for teaching those of ordinary skilled in the art to implement the present application in various ways.

A battery module of the present application includes: a plurality of batteries 1 arranged in a length direction L, each battery 1 including a top cover 10, and a first electrode terminal 11, a second electrode terminal 12 and an explosion-proof valve 13 being disposed on the top cover 10 in a width direction W; and a first heat exchange plate 2 including: a first main body portion 21 located on one side of the plurality of batteries 1 in the width direction W; and a first bending portion 22 bending from an upper side of the first main body portion 21 to the plurality of batteries 1 in the width direction W, the first bending portion 22 covering (including partially covering or completely covering) explosion-proof valves 13 of at least some of the batteries 1 in the width direction W, a flow channel (not shown) for flow of a heat exchange medium being disposed in the first bending portion 22, and the first bending portion 22 being configured to be capable of leaking the heat exchange medium in the flow channel after being melted.

In the battery module of the present application, the first heat exchange plate 2 is configured to exchange heat for the batteries 1, and when a high-temperature and high-pressure gas generated inside the batteries 1 breaks through explosion-proof valves 13 on top covers 10 of the batteries 1 so as to be released from the batteries 1, the high-temperature and high-pressure gas and/or an electrolyte doped in the outflowing high-temperature and high-pressure gas may quickly melt the first bending portion 22 of the first heat exchange plate 2 that covers or is near the explosion-proof valves 13, and the heat exchange medium in the first bending portion 22 flows out. In this case, on one hand, the outflowing heat exchange medium lowers the temperature of the high-temperature and high-pressure gas breaking through the explosion-proof valves 13 and/or the outflowing doped electrolyte to avoid fire. On the other hand, the outflowing heat exchange medium may enter insides of the explosion-proof valves 13 to lower the temperature of the batteries 1. Accordingly, a degree of thermal runaway of the batteries 1 is reduced, so as to buy escape time for a passenger and/or buy time to extinguish the thermal runaway manually.

The heat exchange medium may be of any suitable type, such as water, or water added with a flame retardant, or a liquid other than water.

The battery 1 is a hard shell battery (or referred to as a can-type battery), including an electrode assembly (not shown), a housing, a top cover 10, a first electrode terminal 11, a second electrode terminal 12, and an explosion-proof valve 13. An inside of the housing forms a receiving cavity to accommodate the electrode assembly and an electrolyte. The electrode assembly includes a positive electrode sheet, a negative electrode sheet, and a separator separating the positive electrode sheet from the negative electrode sheet. The electrode assembly may be molded by winding the positive electrode sheet, the negative electrode sheet and the separator, or stacking the positive electrode sheet, the negative electrode sheet and the separator. Both the positive electrode sheet and the negative electrode sheet include a current collector and an active material layer disposed on the current collector. The first bending portion 22 of the first heat exchange plate 2 may completely covers explosion-proof valves 13 of at least some of the batteries 1 in the width direction W, so that the first bending portion 22 of the first heat exchange plate could ensure that the temperature of the high-temperature and high-pressure gad rushed out of any position of the explosion-proof valves 13 and/or the outflowing doped electrolyte is lowered.

There are many arrangements of the explosion-proof valves 13 of the plurality of batteries 1.

The arrangement of disposing an explosion-proof valve 13 of each battery 1 at an end part of the top cover 10 in the width direction W will be described below.

Figure 1:
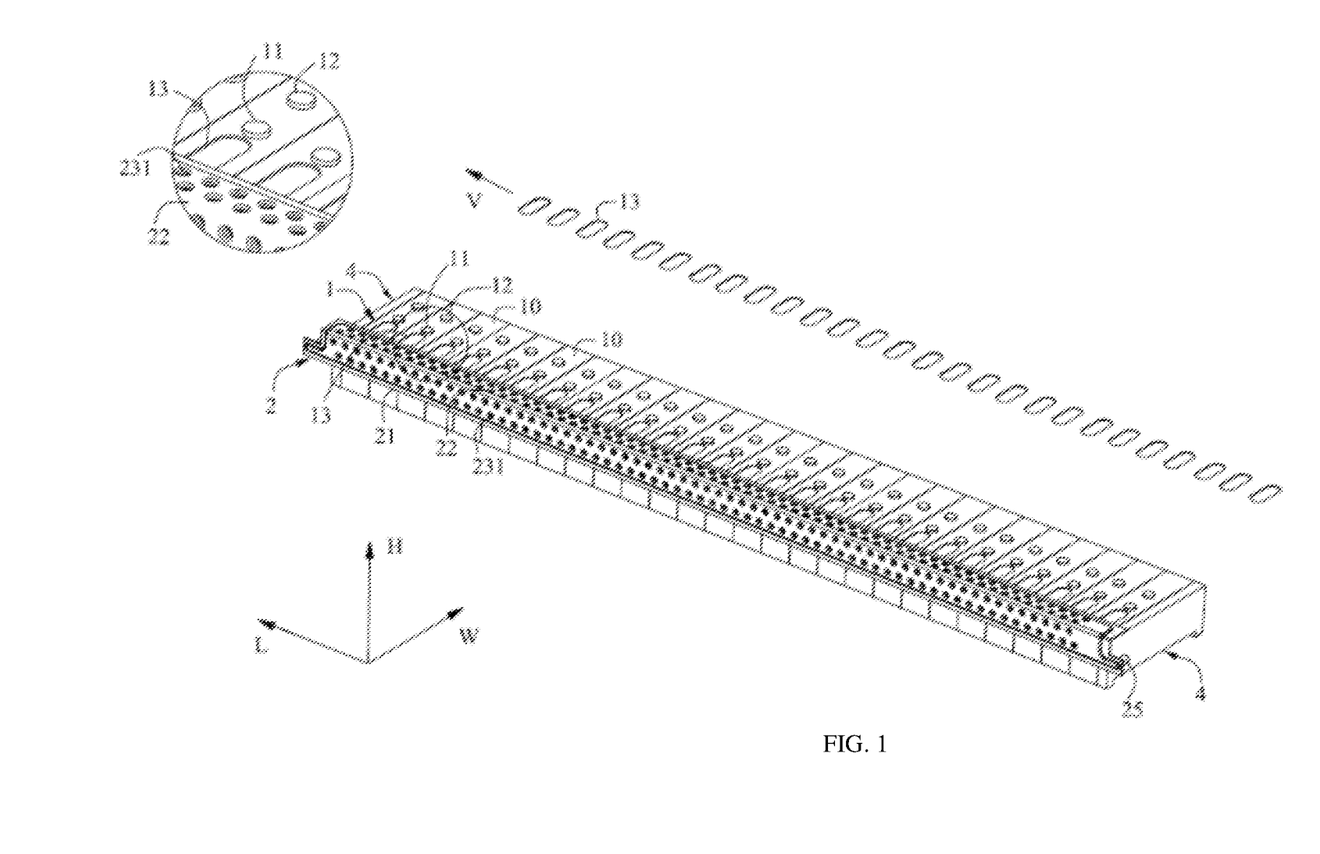
FIG. 1 is a perspective view of an embodiment of a battery module of the present application.

In an embodiment shown in FIG. 1, an explosion-proof valve 13 of each battery 1 is disposed at an end part of the top cover 10 in the width direction W, explosion-proof valves 13 of the plurality of batteries 1 are located on a same side in the width direction W, and the first bending portion 22 of the first heat exchange plate 2 covers the explosion-proof valve 13 of each battery 1 in the width direction W.

Figure 2:
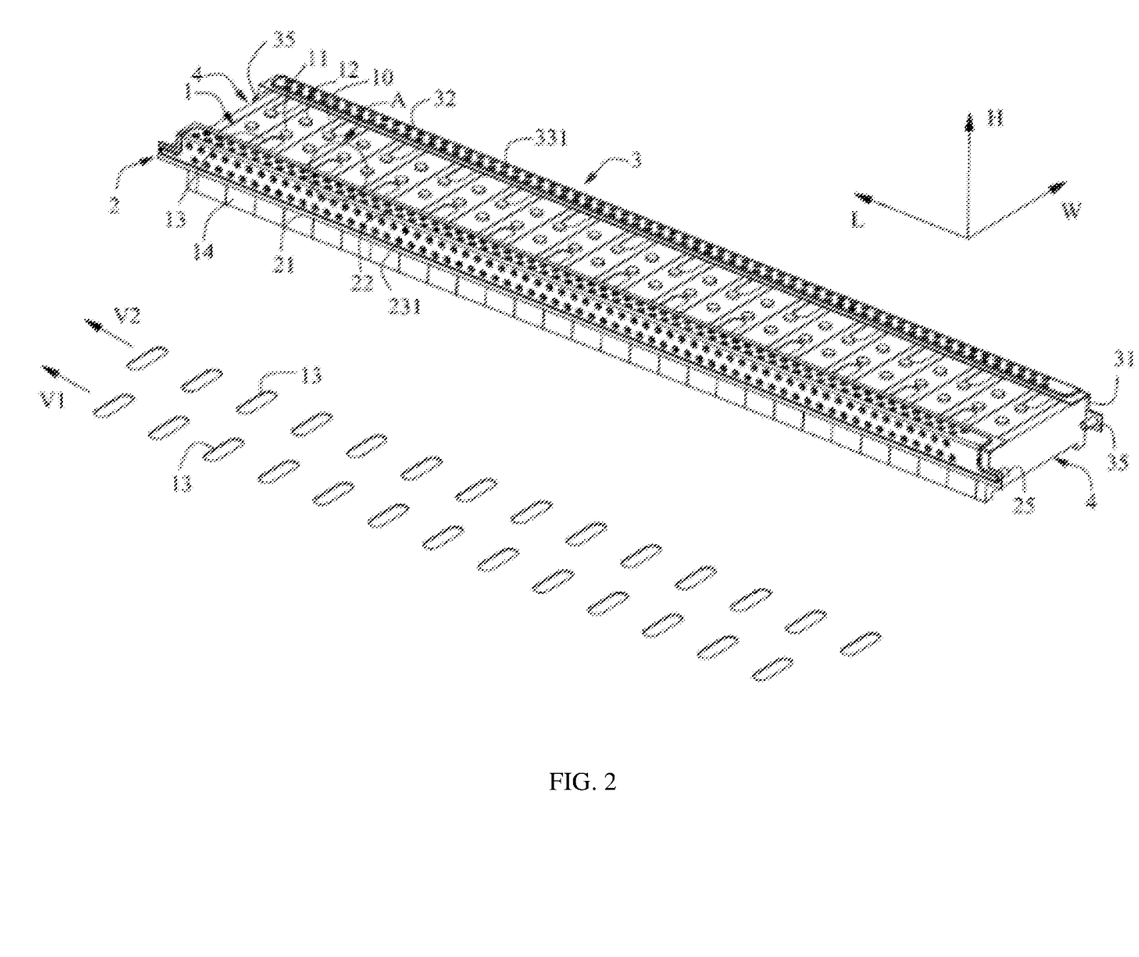
FIG. 2 is a perspective view of another embodiment of a battery module of the present application.
Figure 3:
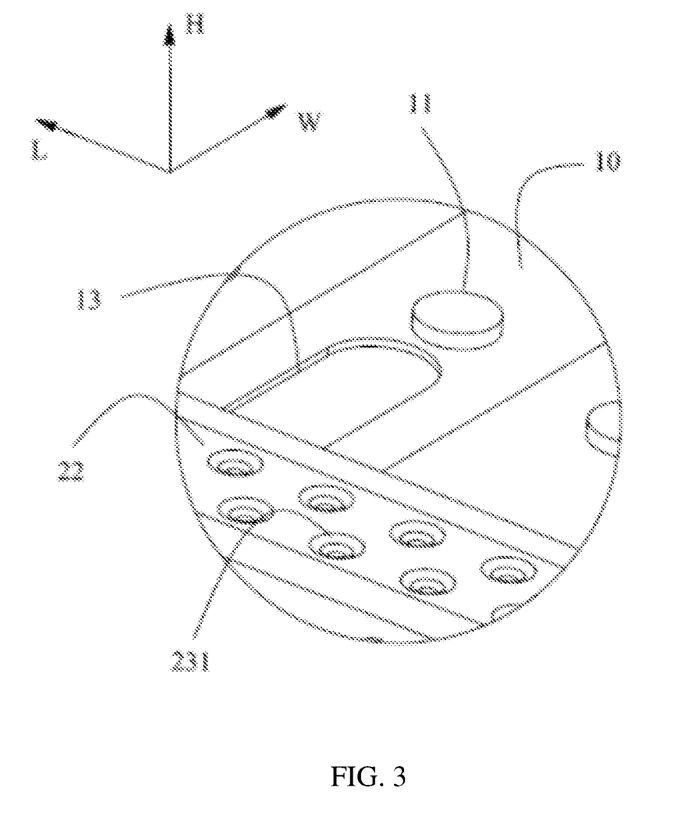
FIG. 3 is an enlarged view of part A in FIG. 2.
Figure 4:
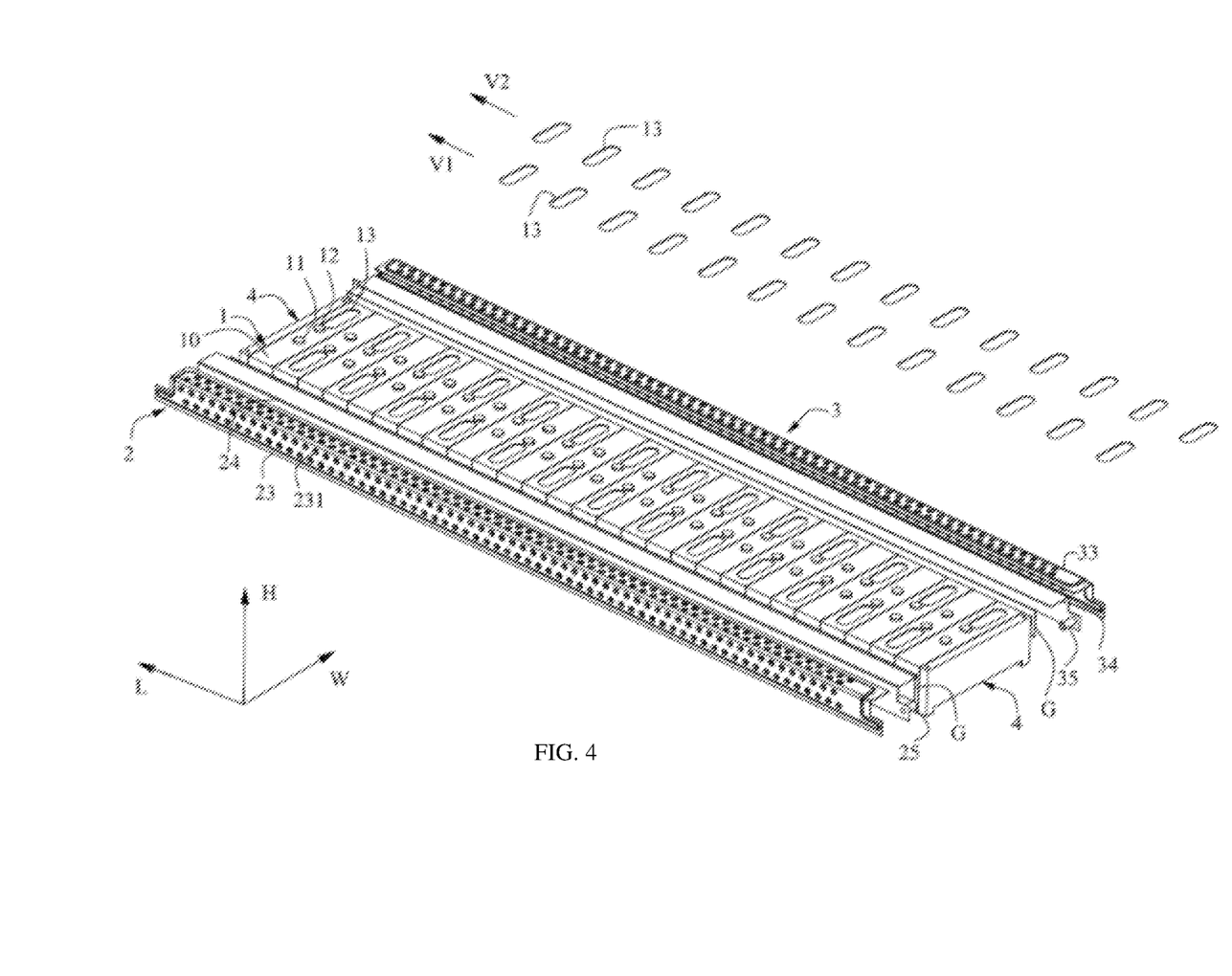
FIG. 4 is a perspective exploded view of the battery module of FIG. 2.

In embodiments shown in FIG. 2 to FIG. 4, an explosion-proof valve 13 of each battery 1 is disposed at an end part of the top cover 10 in the width direction W, and explosion-proof valves 13 of the plurality of batteries 1 are located on two sides in the width direction W; the battery module further includes a second heat exchange plate 3, the second heat exchange plate 3 has the same structure as the first heat exchange plate 2, the second heat exchange plate 3 includes a second main body portion 31 and a second bending portion 32, the first main body portion 21 and the second main body portion 31 are located on two sides of the plurality of batteries 1 in the width direction W, the second bending portion 32 bends from an upper side of the second main body portion 31 to the plurality of batteries 1 in the width direction W, a flow channel (not shown) for flow of a heat exchange medium is disposed in the second bending portion 32, and the second bending portion 32 is configured to be capable of leaking the heat exchange medium in the flow channel after being melted; and the first bending portion 22 and the second bending portion 32 cover explosion-proof valves 13 on corresponding sides in the width direction W.

The arrangement of disposing an explosion-proof valve 13 of each battery 1 between a corresponding first electrode terminal 11 and a corresponding electrode terminal 12 will be described below.

Figure 5:
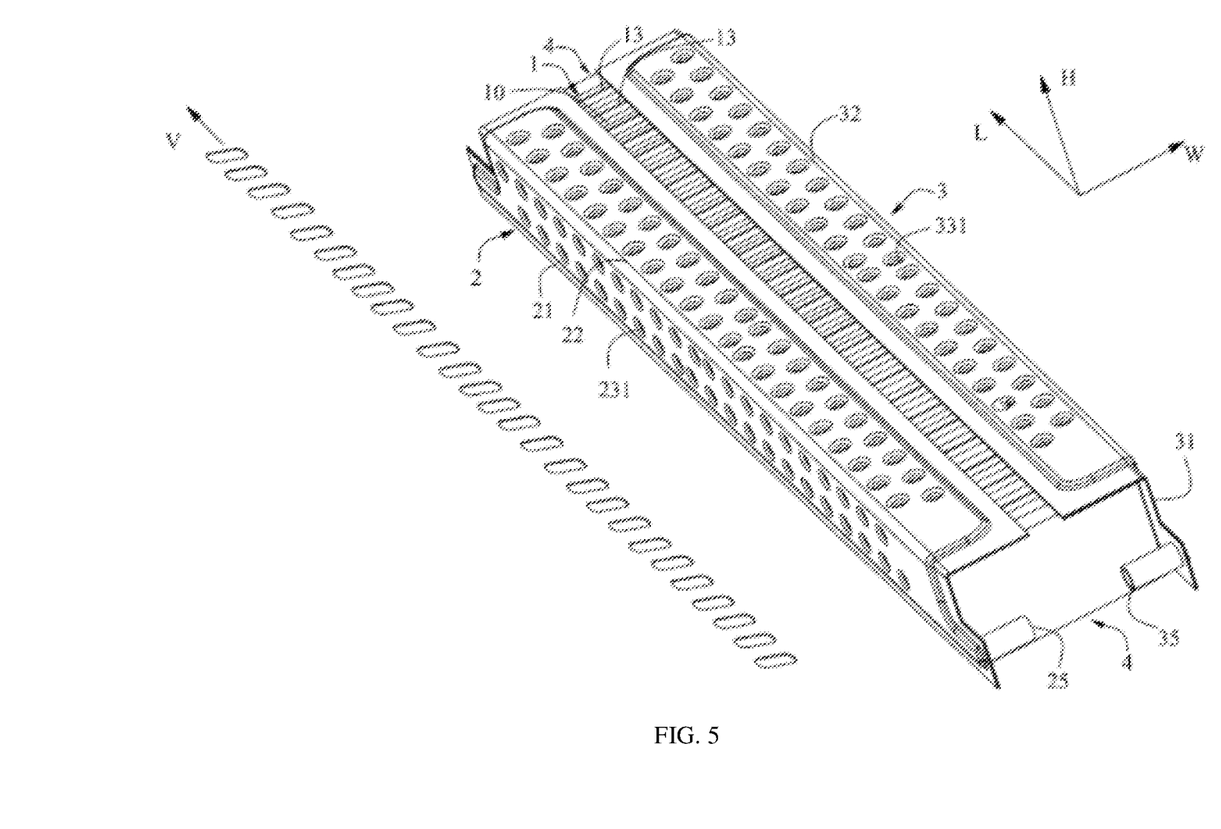
FIG. 5 is a perspective view of yet another embodiment of a battery module of the present application.
Figure 6:
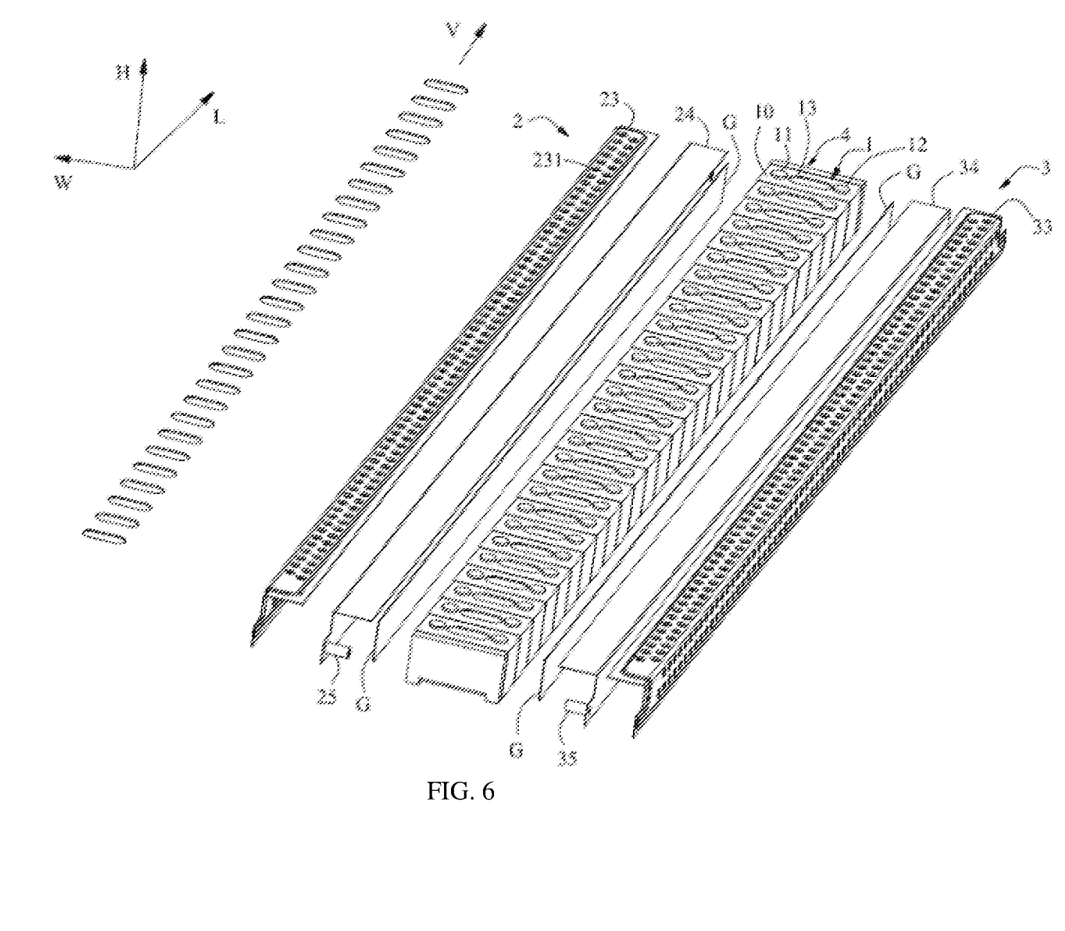
FIG. 6 is a perspective exploded view of the battery module of FIG. 5 viewed from another angle.
Figure 7:
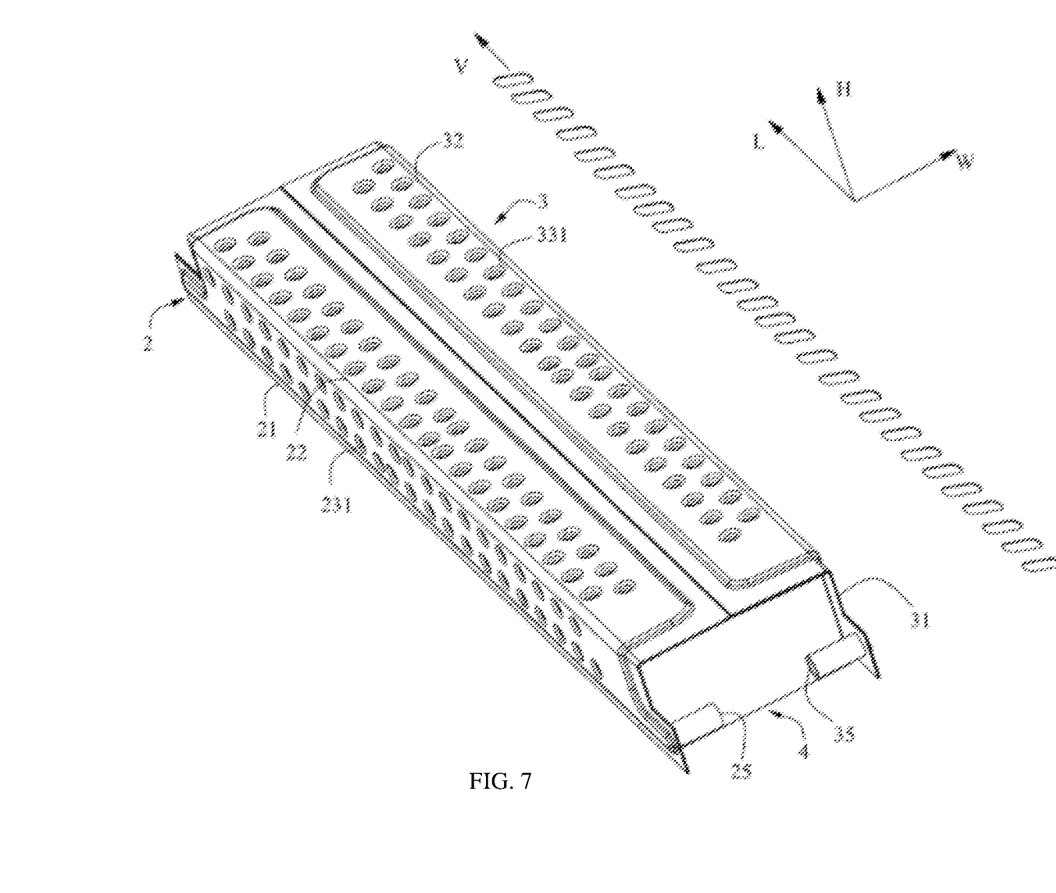
FIG. 7 is a perspective view of still another embodiment of a battery module of the present application.

With reference to FIG. 5 and FIG. 6, an explosion-proof valve 13 of each battery 1 is disposed between a corresponding first electrode terminal 11 and a corresponding second electrode terminal 12, and the first bending portion 22 of the first heat exchange plate 2 covers the explosion-proof valve 13 of each battery 1 in the width direction W. The battery module may further include a second heat exchange plate 3 located on the other side of the plurality of batteries 1 in the width direction W, a flow channel for flow of a heat exchange medium being disposed in the second heat exchange plate 3, and being in thermally conductive contact with corresponding side faces 14 of the plurality of batteries 1 in the width direction W to exchange heat for the plurality of batteries 1. The second heat exchange plate 3 may also have the same structure as the first heat exchange plate 2, so as to be used with the first heat exchange plate 2 to reduce a degree of thermal runaway of the batteries 1. In embodiments shown in FIG. 5 to FIG. 7, an explosion-proof valve 13 of each battery 1 is disposed between a corresponding first electrode terminal 11 and a corresponding second electrode terminal 12, and the first bending portion 22 of the first heat exchange plate 2 covers a part of the explosion-proof valve 13 of each battery 1 in the width direction W; and the second heat exchange plate 3 includes a second main body portion 31 and a second bending portion 32, the second main body portion 31 is located on the other side of the plurality of batteries 1 in the width direction W, the second bending portion 32 bends from an upper side of the second main body portion 31 to the plurality of batteries 1 in the width direction W, the second bending portion 32 covers the other part of the explosion-proof valve 13 of each battery 1 in the width direction W, a flow channel for flow of a heat exchange medium is disposed in the second bending portion 32, and the second bending portion 32 is configured to be capable of leaking the heat exchange medium in the flow channel after being melted. In the embodiment shown in FIG. 7, the first bending portion 22 preferably abuts the second bending portion 32 in the width direction W to completely cover the explosion-proof valves 13, so as to enhance the effect of reducing a degree of thermal runaway of the batteries 1.

The arrangement of disposing explosion-proof valves 13 of some batteries 1 at end parts of corresponding top covers 10 in the width direction W and disposing explosion-proof valves 13 of the other batteries 1 between corresponding first electrode terminals 11 and corresponding second electrode terminals 12 will be described below.

Figure 8:
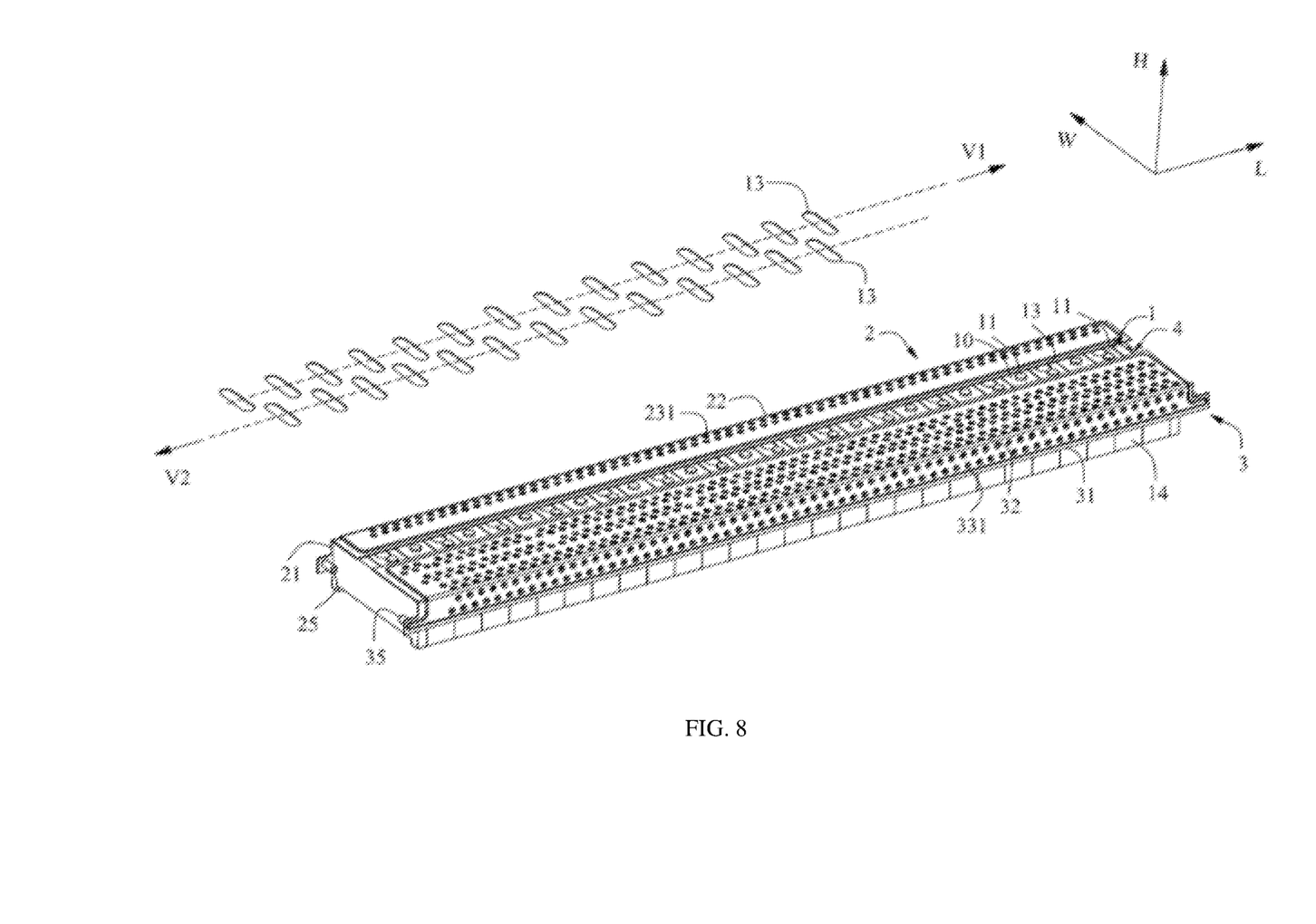
FIG. 8 is a perspective view of a further embodiment of a battery module of the present application.
Figure 9:
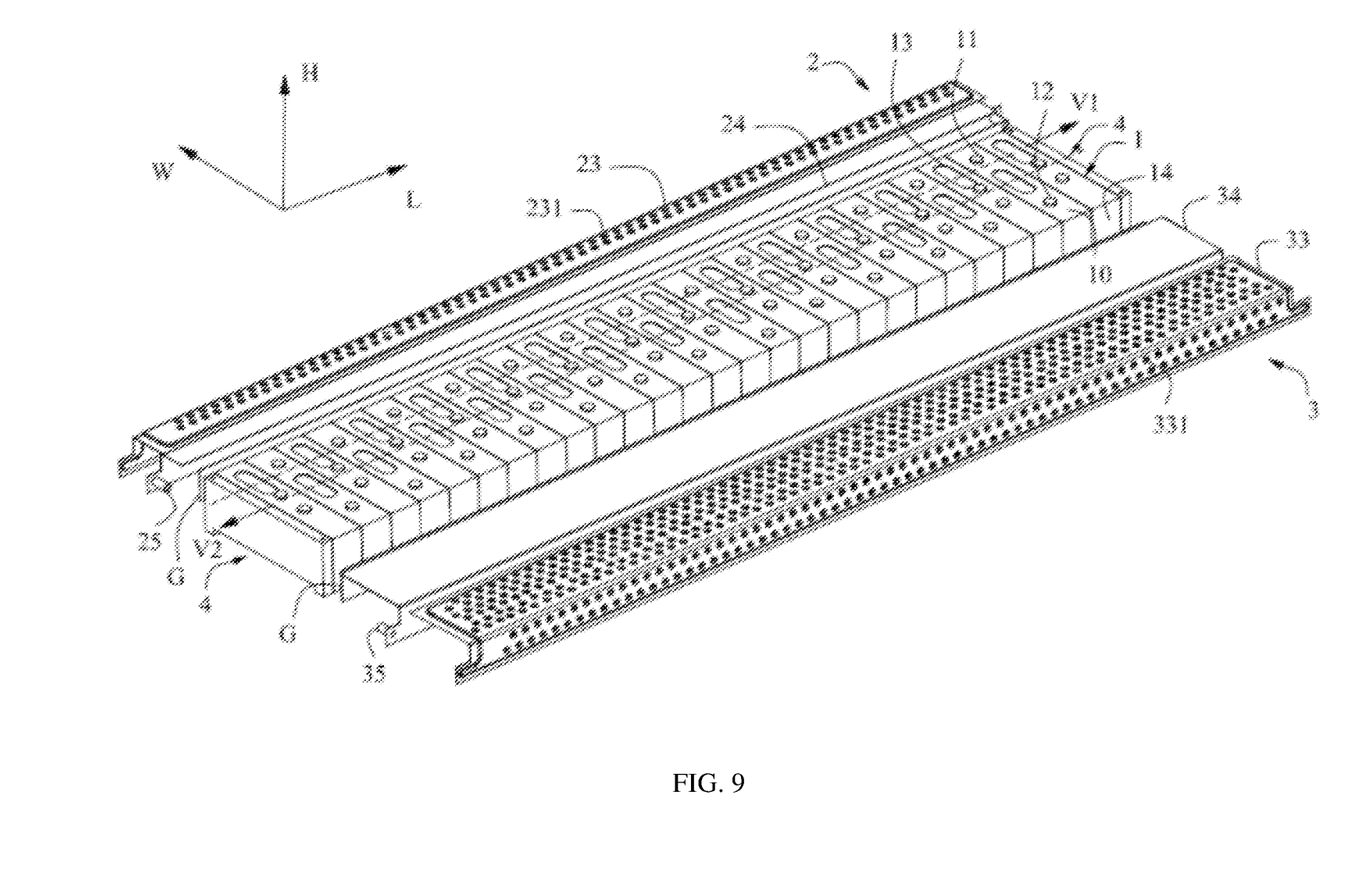
FIG. 9 is a perspective exploded view of the battery module of FIG. 8.

With reference to embodiments shown in FIG. 8 and FIG. 9, explosion-proof valves 13 of some batteries 1 are disposed at end parts of corresponding top covers 10 in the width direction W, and explosion-proof valves 13 of the some batteries 1 are located on a same side in the width direction W; explosion-proof valves 13 of the other batteries 1 are disposed between corresponding first electrode terminals 11 and corresponding second electrode terminals 12; the first bending portion 22 of the first heat exchange plate 2 covers the explosion-proof valves 13 of the some batteries 1 in the width direction W; a second heat exchange plate 3 has the same structure as the first heat exchange plate 2 and includes a second main body portion 31 and a second bending portion 32, the second main body portion 31 is located on the other side of the plurality of batteries 1 in the width direction W, the second bending portion 32 bends from an upper side of the second main body portion 31 to the plurality of batteries 1 in the width direction W, and the second bending portion 32 covers the explosion-proof valves 13 of the other batteries 1 in the width direction W; and a flow channel for flow of a heat exchange medium is disposed in the second bending portion 32, and the second bending portion 32 is configured to be capable of leaking the heat exchange medium in the flow channel after being melted.

In examples shown in the drawings, the first main body portion 21 of the first heat exchange plate 2 is connected to side faces 14 of the plurality of batteries 1 in the width direction W. Specifically, the plurality of batteries 1 and the first main body portion 21 of the first heat exchange plate 2 may be connected through thermally conductive structural glue G, which saves space in the width direction W and provides convenience for a large module. A flow channel for flow of a heat exchange medium is also disposed in the first main body portion 21 of the first heat exchange plate 2, and the first main body portion 21 is in thermally conductive contact with the side faces 14 of the plurality of batteries 1 in the width direction W. The flow channel in the first main body portion 21 and the flow channel in the first bending portion 22 may be independent or communicated.

In the embodiments shown in FIG. 4, FIG. 6 and FIG. 9, the first heat exchange plate 2 includes: a first outer plate 23 provided with first bulging ribs 231 protruding toward the flow channel; and a first inner plate 24 connected to side faces 14 of the plurality of batteries 1 in the width direction W, the first inner plate 24 being connected to the first outer plate 23, and the first inner plate 24, the first bulging ribs 231 of the first outer plate 23 and the first outer plate 23 together forming flow channels for flow of a heat exchange medium in the first main body portion 21 and the first bending portion 22 that are communicated. The first inner plate 24 and the first outer plate 23 may be connected by welding. The first bulging ribs 231 may be formed by inflation or stamping, and the first bulging ribs 231 could increase strength of the first heat exchange plate 2 and form the flow channels. The flow channels may also be formed by inflation or stamping, so that the heat exchange medium flows in the flow channels, and the existence of the first bulging ribs 231 could slow down the flow speed of the heat exchange medium in the flow channels, so as to improve heat exchange efficiency. Certainly, the first heat exchange plate 2 may also be in another structure, and the flow channels may also be disposed in the first heat exchange plate 2 in another form.

In the examples shown in the drawings, a first adapting head 25 in communication with the first heat exchange plate 2 is disposed on the first heat exchange plate 2. Specifically, the first adapting head 25 may be disposed on the first inner plate 24, and may be fixed to the first inner plate 24 by welding. The first adapting head 25 is connected to a water pump through a pipeline so that the heat exchange medium flows in and out, and internal circulation could be achieved.

In the examples shown in the drawings, the second main body portion 31 of the second heat exchange plate 3 is connected to side faces 14 of the plurality of batteries 1 in the width direction W. Specifically, the plurality of batteries 1 and the second main body portion 31 of the second heat exchange plate 3 are connected through thermally conductive structural glue G. A flow channel for flow of a heat exchange medium is also disposed in the second main body portion 31 of the second heat exchange plate 3, and the second main body portion 31 is in thermally conductive contact with the corresponding side faces 14 of the plurality of batteries 1 in the width direction W. Similarly, the flow channel in the second main body portion 31 and the flow channel in the second bending portion 32 may be independent or communicated.

In the embodiments shown in FIG. 4, FIG. 6 and FIG. 9, the second heat exchange plate 3 includes: a second outer plate 33 provided with second bulging ribs 331 protruding toward the flow channel; and a second inner plate 34 connected to corresponding side faces 14 of the plurality of batteries 1 in the width direction W, the second inner plate 34 being connected to the second outer plate 33, and the second inner plate 34, the second bulging ribs 331 of the second outer plate 33 and the second outer plate 33 together forming flow channels for flow of a heat exchange medium in the second main body portion 31 and the second bending portion 32 that are communicated. The second inner plate 34 and the second outer plate 33 may be connected by welding. The second bulging ribs 331 may be formed by inflation or stamping, and the second bulging ribs 331 could increase strength of the second heat exchange plate 3 and form the flow channels. The flow channels may also be formed by inflation or stamping, so that the heat exchange medium flows in the flow channels, and the existence of the second bulging ribs 331 could slow down the flow speed of the heat exchange medium in the flow channels, so as to improve heat exchange efficiency. Certainly, the second heat exchange plate 3 may also be in another structure, and the flow channels may also be disposed in the second heat exchange plate 3 in another form.

In the examples shown in the drawings, a second adapting head 35 in communication with the second heat exchange plate 3 is disposed on the second heat exchange plate 3. Specifically, the second adapting head 35 may be disposed on the second inner plate 34, and may be fixed to the second inner plate 34 by welding. The second adapting head 35 is connected to a water pump through a pipeline so that the heat exchange medium flows in and out, and internal circulation could be achieved.

The battery module may further include end plates 4, and two ends of the first heat exchange plate 2 in the length direction L are fixed to the end plates 4. The first heat exchange plate 2 is connected to the side faces 14 of the batteries 1 through the thermally conductive structural glue G, and cooperates with the end plates 4 to fix the batteries 1, which could reduce contact thermal resistance between the first heat exchange plate 2 and the batteries 1 to play a role of exchanging heat for the batteries 1. When the second heat exchange plate 3 is provided, two ends of the second heat exchange plate 3 in the length direction L may also be fixed to the end plates 4. The second heat exchange plate 3 in the present application may be selectively provided according to needs, and may be omitted when no needed.

Finally, it is supplemented that, as shown in FIG. 1 and FIG. 5 to FIG. 7, all of the explosion-proof valves 13 of the plurality of batteries 1 form a row of explosion-proof valves V arranged in the length direction L. As shown in FIG. 2, FIG. 4, FIG. 8 and FIG. 9, the explosion-proof valves 13 of the plurality of batteries 1 form a first row of explosion-proof valves V1 and a second row of explosion-proof valves V2 arranged in the width direction W. In a battery module, explosion-proof valves are designed and arranged in the form of the row of explosion-proof valves V, which facilitates planning and arrangement of components, such as the first heat exchange plate 2 and the second heat exchange plate 3.

The foregoing detailed descriptions describe a number of exemplary embodiments, but are not intended to limit the explicitly disclosed combinations herein. Therefore, unless otherwise stated, various features disclosed herein can be combined together to form multiple additional combinations that are not shown for the purpose of brevity.

The foregoing descriptions are merely preferred embodiments of the present application, and are not intended to limit the present application. For those skilled in the art, the present application can have various modifications and variations. Any modification, equivalent substitution, improvement or the like, made within the spirit and principle of the present application, shall fall within the protection scope of the present application.

What is claimed is:

1. A battery module, comprising:
    a plurality of batteries configured to be arranged in a length direction, wherein each of the plurality of batteries comprises a top cover, and along a width direction of the top cover, a first electrode terminal, a second electrode terminal and an explosion-proof valve are disposed on the top cover; and
    a first heat exchange plate comprising: a first main body portion and a first bending portion;
    wherein the first main body portion is configured to be located on one side of the plurality of batteries in the width direction; and
    the first bending portion is configured to bend from an upper side of the first main body portion to the plurality of batteries along the width direction and cover explosion-proof valves of at least one of the plurality of batteries in the width direction, and wherein a flow channel for flow of a liquid is configured to be disposed in the first bending portion, and the first bending portion is configured to leak the liquid in the flow channel so as to enter insides of the explosion-proof valves to lower temperature of the plurality of batteries after the first bending portion is melted by a high-temperature and high-pressure gas when the high-temperature and high-pressure gas generated inside the batteries breaks through the explosion-proof valves.

2. The battery module according to claim 1, wherein the first bending portion is configured to completely cover the explosion-proof valves of the at least one of the plurality of batteries in the width direction.

3. The battery module according to claim 1, wherein the explosion-proof valve is configured to be disposed between the first electrode terminal and the corresponding second electrode terminal, and the first bending portion is configured to cover the explosion-proof valve of each of the plurality of batteries in the width direction.

4. The battery module according to claim 1, wherein the explosion-proof valve is configured to be disposed at an end part of the top cover in the width direction, and explosion-proof valves of the plurality of batteries are configured to be located on a same side in the width direction, and the first bending portion is configured to cover the explosion-proof valve of each of the plurality of batteries in the width direction.

5. The battery module according to claim 3, wherein the battery module further comprises: a second heat exchange plate;
    wherein the second heat exchange plate is configured to be located on the other side of the plurality of batteries in the width direction, provide with a flow channel for flow of a heat exchange medium therein, and be in thermally conductive contact with corresponding side faces of the plurality of batteries in the width direction.

6. The battery module according to claim 4, wherein the battery module further comprises: a second heat exchange plate;
    wherein the second heat exchange plate is configured to be located on the other side of the plurality of batteries in the width direction, provide with a flow channel for flow of a heat exchange medium therein, and be in thermally conductive contact with corresponding side faces of the plurality of batteries in the width direction.

7. The battery module according to claim 3, wherein the first bending portion is configured to cover a part of the explosion-proof valve of each of the plurality of batteries in the width direction;
    the battery module further comprises a second heat exchange plate;
    wherein the second heat exchange plate comprises: a second main body portion and a second bending portion;
    wherein the second main body portion is configured to be located on the other side of the plurality of batteries in the width direction, and the second bending portion is configured to bend from an upper side of the second main body portion to the plurality of batteries along the width direction, the second bending portion is configured to cover the other part of the explosion-proof valve of each of the plurality of batteries in the width direction; and
    wherein a flow channel for flow of a heat exchange medium is configured to be disposed in the second bending portion, and the second bending portion is configured to leak the heat exchange medium in the flow channel after the second bending portion is melted.

8. The battery module according to claim 7, wherein the first bending portion and the second bending portion are configured to be abutted in the width direction.

9. The battery module according to claim 1, wherein the explosion-proof valve is configured to be disposed at an end part of the top cover in the width direction, and explosion-proof valves of the plurality of batteries are configured to be located on two sides of the plurality of batteries in the width direction;
    the battery module further comprises a second heat exchange plate;
    wherein the second heat exchange plate comprises: a second main body portion and a second bending portion;
    wherein the second bending portion is configured to bend from an upper side of the second main body portion to the plurality of batteries along the width direction, a flow channel for flow of a heat exchange medium is configured to be disposed in the second bending portion, and the second bending portion is configured to leak the heat exchange medium in the flow channel after the second bending portion is melted; and wherein the first main body portion and the second main body portion are configured to be located on two sides of the plurality of batteries in the width direction, and the first bending portion and the second bending portion are configured to cover explosion-proof valves on corresponding sides in the width direction.

10. The battery module according to claim 1, wherein explosion-proof valves of a part of the plurality of batteries are configured to be disposed at end parts of corresponding top covers in the width direction, and explosion-proof valves of the part of the plurality of batteries are configured to be located on a same side in the width direction; explosion-proof valves of the other part of the plurality of batteries are configured to be disposed between corresponding first electrode terminals and corresponding second electrode terminals; the first bending portion is configured to cover the explosion-proof valves of the part of the plurality of batteries in the width direction;
the battery module further comprises a second heat exchange plate;
wherein the second heat exchange plate comprises: a second main body portion and a second bending portion;
wherein the second main body portion is configured to be located on the other side of the plurality of batteries in the width direction, and the second bending portion is configured to bend from an upper side of the second main body portion to the plurality of batteries along the width direction, the second bending portion is configured to cover the explosion-proof valves of the other part of the plurality of batteries in the width direction; and a flow channel for flow of a heat exchange medium is configured to be disposed in the second bending portion, and the second bending portion is configured to leak the heat exchange medium in the flow channel after the second bending portion is melted.

11. The battery module according to claim 1, wherein a flow channel for flow of a heat exchange medium is also configured to be disposed in the first main body portion, and the first main body portion is configured to be in thermally conductive contact with side faces of the plurality of batteries in the width direction.

12. The battery module according to claim 7, wherein a flow channel for flow of a heat exchange medium is also configured to be disposed in the second main body portion, and the second main body portion is configured to be in thermally conductive contact with corresponding side faces of the plurality of batteries in the width direction.

13. The battery module according to claim 9, wherein a flow channel for flow of a heat exchange medium is also configured to be disposed in the second main body portion, and the second main body portion is configured to be in thermally conductive contact with corresponding side faces of the plurality of batteries in the width direction.

14. The battery module according to claim 10, wherein a flow channel for flow of a heat exchange medium is also configured to be disposed in the second main body portion, and the second main body portion is configured to be in thermally conductive contact with corresponding side faces of the plurality of batteries in the width direction.

15. The battery module according to claim 1, wherein the first main body portion of the first heat exchange plate is configured to be connected to side faces of the plurality of batteries in the width direction.

16. The battery module according to claim 1, wherein the first heat exchange plate comprises:
a first outer plate and a first inner plate;
wherein the first outer plate is configured to provide with first bulging ribs, and the first bulging ribs are configured to protrude toward the flow channel; and
the first inner plate is configured to be connected to side faces of the plurality of batteries in the width direction, and be connected to the first outer plate, and the first inner plate, the first bulging ribs of the first outer plate and the first outer plate are configured to together form flow channels for flow of a heat exchange medium in the first main body portion and the first bending portion that are communicated.

17. The battery module according to claim 7, wherein the second main body portion of the second heat exchange plate is configured to be connected to side faces of the plurality of batteries in the width direction.

18. The battery module according to claim 9, wherein the second main body portion of the second heat exchange plate is configured to be connected to side faces of the plurality of batteries in the width direction.

19. The battery module according to claim 10, wherein the second main body portion of the second heat exchange plate is configured to be connected to side faces of the plurality of batteries in the width direction.

20. The battery module according to claim 7, wherein the second heat exchange plate comprises:
a second outer plate and a second inner plate;
wherein the second outer plate is configured to provide with second bulging ribs and the second bulging ribs are configured to protrude toward the flow channel; and
the second inner plate is configured to be connected to corresponding side faces of the plurality of batteries in the width direction and be connected to the second outer plate, and the second inner plate, the second bulging ribs of the second outer plate and the second outer plate are configured to together form flow channels for flow of a heat exchange medium in the second main body portion and the second bending portion that are communicated.

* * * * *